United States Patent
Sawyer

(10) Patent No.: US 8,079,896 B1
(45) Date of Patent: Dec. 20, 2011

(54) SHRIMP-CUTTING MACHINE FOR CUTTING INTERMEDIATE JOINTS

(75) Inventor: Derrell Sawyer, Caddo Mills, TX (US)

(73) Assignee: Prawnto Shrimp Machine Company, Caddo Mills, TX (US)

( * ) Notice: Subject to any disclaimer, the term of this patent is extended or adjusted under 35 U.S.C. 154(b) by 0 days.

(21) Appl. No.: 13/135,553

(22) Filed: Jul. 8, 2011

(51) Int. Cl.
*A22C 29/02* (2006.01)

(52) U.S. Cl. ............................................. 452/3

(58) Field of Classification Search ................ 452/1–13, 452/16, 17
See application file for complete search history.

(56) References Cited

U.S. PATENT DOCUMENTS

| | | | | |
|---|---|---|---|---|
| 2,537,836 A | * | 1/1951 | Feldkamp | 452/3 |
| 2,702,921 A | | 3/1955 | Pinney | |
| 4,196,495 A | * | 4/1980 | Mestayer et al. | 452/9 |
| 4,928,352 A | * | 5/1990 | Thibodeaux | 452/1 |
| 5,035,669 A | * | 7/1991 | Betts | 452/5 |
| 5,035,670 A | * | 7/1991 | Pershinske | 452/5 |
| 5,290,199 A | | 3/1994 | Morris | |
| 5,569,065 A | | 10/1996 | Sawyer | |
| 6,129,621 A | * | 10/2000 | Shelton | 452/3 |
| 6,273,807 B1 | * | 8/2001 | Shelton | 452/3 |
| 6,488,576 B1 | * | 12/2002 | Shelton | 452/3 |
| 7,467,992 B2 | | 12/2008 | Sawyer | |

* cited by examiner

*Primary Examiner* — Richard Price, Jr.
(74) *Attorney, Agent, or Firm* — Steven W. Smith

(57) ABSTRACT

An apparatus for cutting a shrimp body, the shrimp body having a tail portion that includes a plurality of tail sections connected by joints. A motorized driving mechanism mounted inside a housing drives a cutting mechanism mounted outside the housing. The cutting mechanism includes a rotating cutting disk and a holding and carrying mechanism configured to securely hold the shrimp body and carry the shrimp body past the rotating cutting disk. The holding and carrying mechanism is configured to position the shrimp body in relation to the rotating cutting disk so that when the cutting disk cuts the shrimp body, the cutting disk leaves intact, a first joint at a head end of the tail portion and a last joint at a tail end of the tail portion, while cutting at least one intermediate joint between the first and last joints.

16 Claims, 3 Drawing Sheets

SHRIMP-CUTTING MACHINE FOR CUTTING INTERMEDIATE JOINTS

BACKGROUND OF THE INVENTION

This invention is related to a machine for cutting shrimp, and, more specifically, to an apparatus for cutting intermediate joints of shrimp bodies while leaving a first joint and last joint intact.

Shrimp-cutting and deveining machines have existed for a number of years. An early version is shown in U.S. Pat. No. 2,702,921 to Pinney. Pinney, however, had several disadvantages. First, the machine used a feed drum to support the shrimp, which placed severe limitations on the degree of control provided to an operator during the cutting process. Second, the machine did not enable rapid adjustment of the cutting depth in accordance with the size and thickness of the shrimp. Third, the cutting mechanism was inside an enclosure, thus making cleaning and sanitization difficult.

Another existing shrimp-cutting and deveining machine is shown in U.S. Pat. No. 5,290,199 to Morris. Morris discloses an improvement of the shrimp-cutting machine in Pinney by creating a more sanitary machine with a closed housing for a motor and drive mechanism, and by mounting the cutting mechanism externally and covering it with a protective shield. Morris provided the capability to adjust the depth of the cut by rotating an adjusting knob on the side of the housing, but utilized a polycarbonate idler roller similar to the feed drum in Pinney to support the bottom of the shrimp during the cutting process. The idler roller limited the adjustment capabilities, and the adjustment process was time consuming and could not be performed dynamically as shrimp bodies of different sizes were fed through the machine.

U.S. Pat. No. 5,569,065 to Sawyer et al. improved on the Morris machine by utilizing two pairs of rotating flexible disks, an upper pair to grasp the top side of shrimp bodies and propel them past a cutting disk, and a lower pair to grasp the bottom side of the shrimp bodies and to dynamically adjust to shrimp bodies of different sizes. The Sawyer machine could also make a "butterfly" cut in which it completely cut through the front portion of a shrimp body while leaving at least one of the tail sections intact.

U.S. Pat. No. 7,467,992 to Sawyer disclosed an apparatus and method for belly-cutting shrimp. A curved, V-shaped guide channel was used to guide the underside of the shrimp bodies past a circular cutting blade, which belly-cut the shrimp to a depth determined by adjusting the position of the guide channel.

BRIEF SUMMARY OF THE INVENTION

All of the existing shrimp-cutting machines fail to address a particular type of cut commonly referred to as a "European cut". The European cut is a cut along the back of the shrimp body in which several intermediate joints are cut, but end joints at the head and tail of the shrimp body are left intact. The cut removes the sand vein from the shrimp body, but by leaving the end joints intact, the shrimp body maintains its natural curvature while being cooked. Currently, chefs must perform the European cut manually. The present invention provides a shrimp-cutting machine with the sanitation improvements of Morris and the capability to more precisely and dynamically control the depth and position of the cut on each shrimp body as it passes through the machine so as to provide a European cut.

In one embodiment, the present invention is an apparatus for cutting a shrimp body, the shrimp body having a tail portion that includes a plurality of tail sections connected by joints. The apparatus includes a housing; a motorized driving means mounted inside the housing; and a cutting mechanism mounted outside the housing, the cutting mechanism being driven by the motorized driving means. The cutting mechanism includes a rotating cutting disk rotated by the motorized driving means; and means for securely holding the shrimp body and carrying the shrimp body past the rotating cutting disk. The holding and carrying means is configured to position the shrimp body in relation to the rotating cutting disk so that when the cutting disk cuts the shrimp body, the cutting disk leaves a first joint at a head end of the tail portion and a last joint at a tail end of the tail portion intact while cutting at least one intermediate joint between the first and last joints.

The apparatus may also include an insertion mechanism for inserting the shrimp body into the holding and carrying means before the shrimp body passes the cutting disk; and an extraction mechanism for extracting the shrimp body from the holding and carrying means after the shrimp body passes the rotating cutting disk.

In another embodiment, the present invention is an apparatus for cutting shrimp bodies in which an improvement comprises a mechanism configured to securely hold the shrimp body and carry the shrimp body past the rotating cutting disk in a position in which the cutting disk leaves intact, a first joint at a head end of the tail portion and a last joint at a tail end of the tail portion, while cutting at least one intermediate joint between the first and last joints.

BRIEF DESCRIPTION OF THE SEVERAL VIEWS OF THE DRAWING

In the following, the essential features of the invention will be described in detail by showing preferred embodiments, with reference to the attached figures in which.

DETAILED DESCRIPTION OF THE INVENTION

The present invention provides an apparatus for cutting intermediate joints of shrimp bodies while leaving a first joint and last joint intact.

Figure 1:
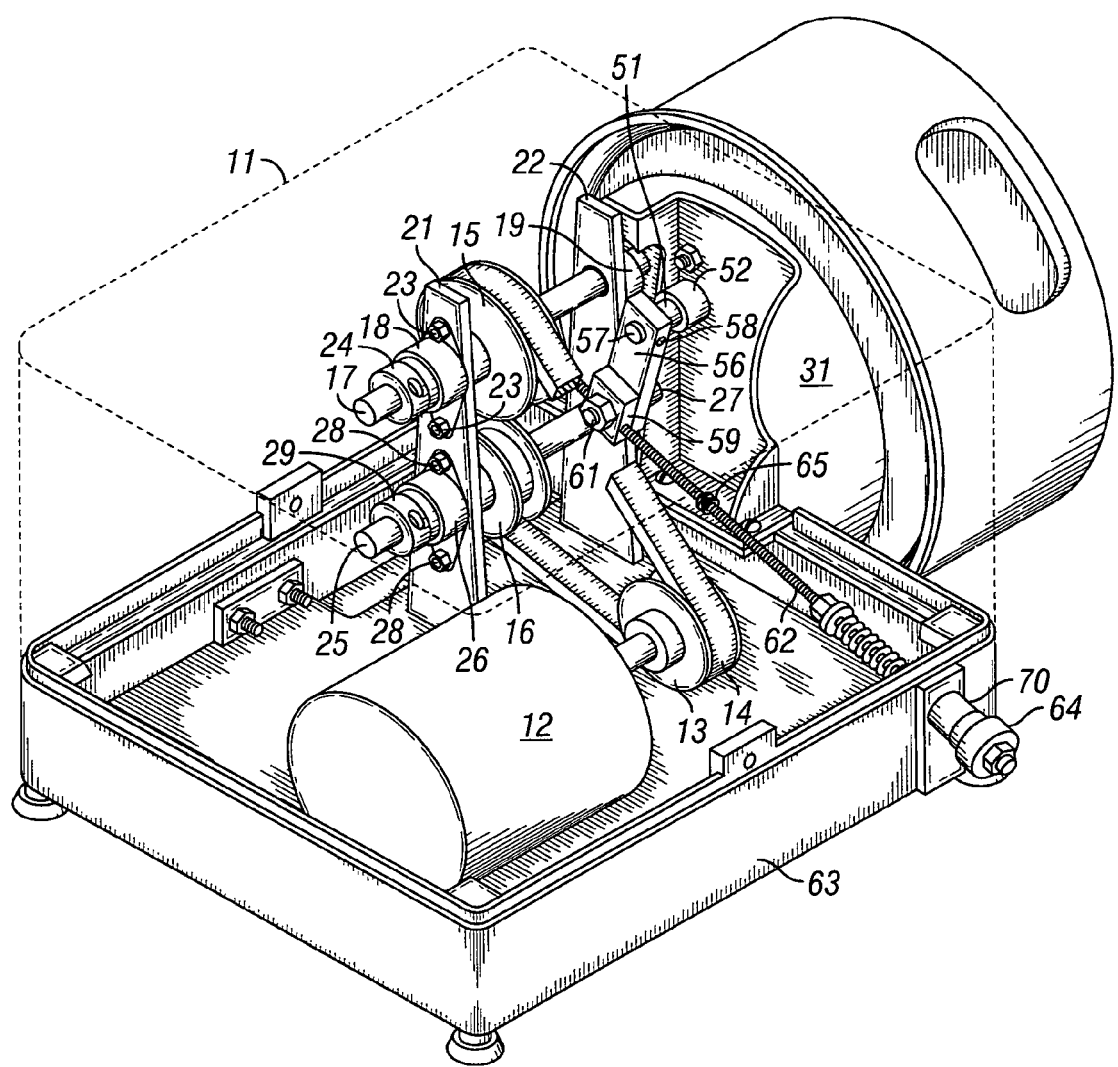
FIG. 1 is a frontal, left-side perspective view of an exemplary embodiment of the shrimp deveining apparatus of the present invention showing an internal drive mechanism, and with a motor housing shown in phantom.

FIG. 1 is a frontal, left-side perspective view of an exemplary embodiment of the shrimp deveining apparatus of the present invention showing an internal drive mechanism, and with a motor housing 11 shown in phantom. The housing contains a drive mechanism, which may comprise, for example, an electric motor 12, motor pulley 13, drive belt 14, upper pulley 15, and lower pulley 16. The upper pulley is mounted on an upper shaft 17, which is supported by bearings 18 and 19. The bearings are mounted to vertical struts 21 and 22 by screws 23. The upper shaft 17 is prevented from sliding along its longitudinal axis by a combination bushing and setscrew 24.

The lower pulley 16 is mounted on a lower shaft 25, which is supported by bearings 26 and 27. The bearings 26 and 27 are mounted to vertical struts 21 and 22 directly below the upper shaft 17 by screws 28. The lower shaft 25 is prevented from sliding along its longitudinal axis by a combination bushing and setscrew 29.

The upper shaft 17 and lower shaft 25 extend through apertures in a circular housing plate 31 mounted on the side of the housing 11. Elastomeric seals such as seal 32 (FIG. 2) provide a water-tight seal between the upper shaft 17 and the circular housing plate 31, and between the lower shaft 25 and the circular housing plate.

Figure 2:
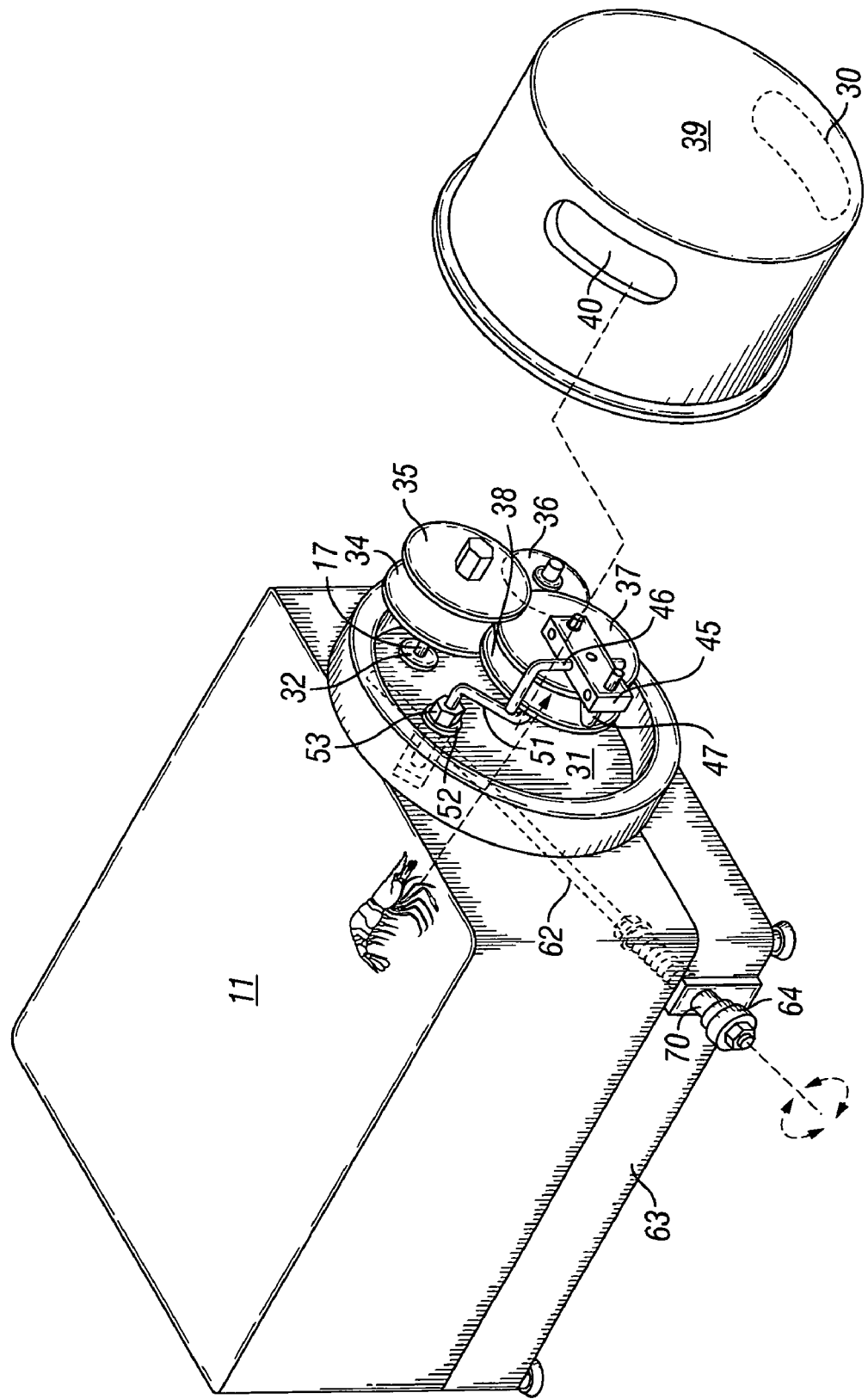
FIG. 2 is a frontal, right-side perspective view of the shrimp deveining apparatus of FIG. 1 showing a housing for an internal motor and drive mechanism, an external cutting mechanism, and with a protective shield removed.

FIG. 2 is a frontal, right-side perspective view of the shrimp deveining apparatus of FIG. 1 showing the housing 11 for the internal motor and drive mechanism, an external cutting mechanism, and with a protective shield removed. An upper pair of flexible disks 34 and 35 (referred to herein as drive disks) are mounted near the end of the upper shaft 17. The drive disks are constructed of an elastomeric material, which may be, for example, a polyurethane formulation from Miles Corporation and molded into disks by Superior Plastics, Inc. of Fort Worth, Tex. A knurled insert (not shown), which may be, for example rubber, fits tightly around the upper shaft 17. Each of the drive disks fits tightly around the knurled insert and is caused thereby to rotate with the upper shaft. The main body of the drive disks has the proper degree of flexibility and rigidity to contact the lower disks 37 and 38 and cause them to rotate on an adjusting shaft 51. The drive disks may be constructed of polyurethane of a thickness of approximately 0.04 inches, and an inner section may be angled off of the vertical by approximately 8.0 degrees. An outer section of the drive disks may be angled off the vertical approximately 35 degrees.

Figure 3:
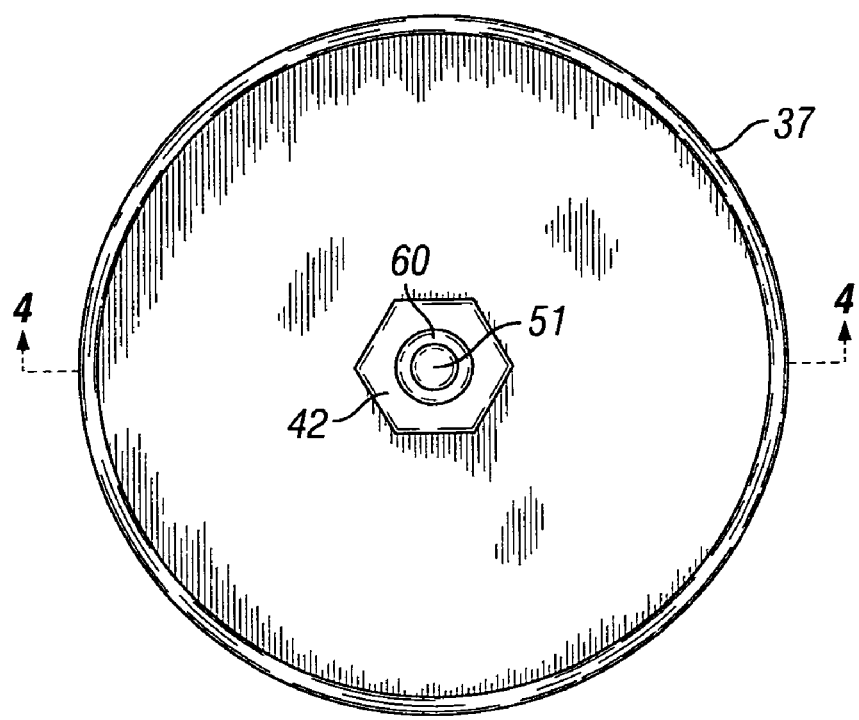
FIG. 3 is a right-side elevational view of a lower pair of flexible disks mounted on an adjusting shaft in the preferred embodiment of the present invention.

FIG. 3 is a right-side elevational view of the lower flexible disks 37 and 38 mounted on the adjusting shaft 51 in the preferred embodiment of the present invention. The lower flexible disks are also preferably constructed of the polyurethane formulation from Miles Corporation and molded into disks by Superior Plastics, Inc. of Fort Worth, Tex. The lower flexible disks are mounted on a hexagonal metal frame 42, which freewheels on a small plastic sleeve bearing 60 mounted on the adjusting shaft 51.

Figure 4:
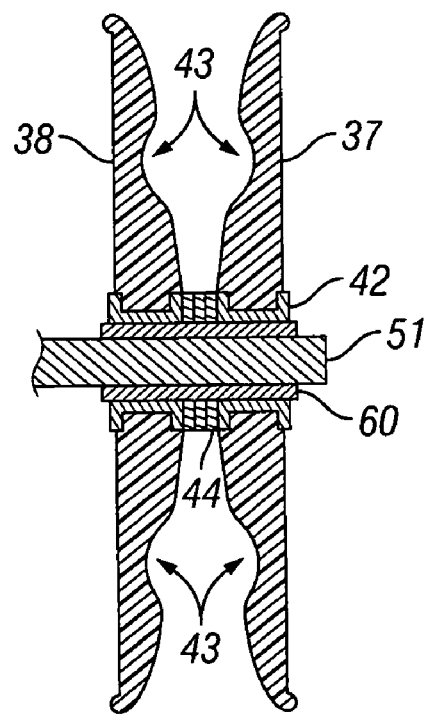
FIG. 4 is a cross sectional view of the lower pair of flexible disks, taken along the line 4-4 of FIG. 3.

FIG. 4 is a cross sectional view of the lower flexible disks 37 and 38, taken along the line 4-4 of FIG. 3. The lower disks may be constructed of polyurethane, which at its point of maximum thickness is approximately 0.25 inches. The curvature of the interior surfaces of the lower disks creates a concave region 43 between the disks for holding a shrimp body securely in position for cutting precisely where desired. The main body of the lower disks has the proper degree of flexibility and rigidity to properly grasp shrimp bodies and prevent both longitudinal rotation and sliding of the shrimp body radially from the shaft as the disks rotate and pass the shrimp body through the cutting mechanism. The flexibility of the lower disks also causes the disks to diverge farther apart when shrimp bodies of greater diameter are placed between the disks. Plastic spacer washers 44 may be placed on the adjusting shaft 51 between the lower flexible disks to adjust the size of the region between the disks to accommodate different sizes of shrimp.

Referring again to FIGS. 1 and 2, the drive belt 14 from the motor 12 engages pulleys 15 and 16 mounted on the upper and lower parallel shafts, respectfully. The pulley 15 mounted on the upper shaft has a larger diameter than pulley 16, mounted on the lower shaft 75. Therefore, for a given motor speed, the upper shaft 17, which has the drive disks 34 and 35 mounted on the outside end thereof, rotates at a lower RPM than the lower shaft 25, which has the cutting disk 36 mounted near the outside end thereof. Thus, the cutting disk 36 turns at a higher rate of rotation than the drive disks 34 and 35 mounted thereabove.

Note that through contact with the lower flexible disks 37 and 38, the drive disks cause the lower flexible disks to rotate (freewheel) on the adjusting shaft 51 at approximately the same RPM as the drive disks. Thus when the lower flexible disks 37 and 38 pull the shrimp downward into contact with the cutting disk 36, the edge of the cutting disk 36 is moving downward at a higher rate of speed than the shrimp, and therefore, makes a clean cut in the back of the shrimp.

Motor pulley 13 may have a diameter of approximately 1 inch while the diameter of the upper pulley 15 may be approximately 3 inches. This ratio optimizes the motor speed in order to reduce the speed of the drive belt 14 and increase torque on the upper pulley 15 and lower pulley 16. The lower belt speed reduces noise, reduces heat in the motor housing 11, and causes less wear and tear on machine parts than previous shrimp cutting machines.

The adjusting shaft 51 extends through an aperture in the circular housing plate 31, where it is journalled by a bearing 52. In FIG. 2, it can be seen that an elastomeric seal 53 provides a water-tight seal between the bearing 52 and its journal, thereby completely preventing any debris from the shrimp-cutting operation from entering the motor housing 11.

Still referring to FIG. 2, it can be seen that the exterior portion of the adjusting shaft 51 has two equal-but-opposite bends in it to form a parallel portion, which is offset from the axis of rotation of the adjusting shaft 51. As noted above, the lower pair of flexible disks 37 and 38 is mounted near the external end of the adjusting shaft 51. A bracket 45 is mounted on the end of the adjusting shaft adjacent to the lower flexible disks. The bracket holds two bars. A first bar 46 extends upward and makes a right angle to extend across the top of the lower flexible disks. A second bar 47 bends approximately 120-130 degrees and extends into the space between the lower flexible disks.

In one embodiment, the lower flexible disks freewheel on a small plastic sleeve bearing 60 (FIG. 3) and hold the shrimp bodies in the concave region 43 of the disks as the shrimp bodies pass through the cutting mechanism. When viewed from the right side of the machine, the drive disks 34 and 35 are rotated counter-clockwise by the motor assembly inside the housing 11. The lower disks 37 and 38 are partly inserted between the drive disks and are in contact with the drive disks. The counter-clockwise rotation of the drive disks causes the lower disks 37 and 38 to rotate clockwise. The shrimp bodies are fed headfirst, with the backside facing upward, through the oval opening 40 on the cover 39 into the cutting mechanism. The shrimp bodies pass just under the first bar 46, which forces the shrimp bodies into the concave region where they are held securely in place with the backside facing outward. As the lower disks rotate, the backside of the shrimp body is cut by the cutting disk 36 as the body passes by. The novel concave region 43 of the lower disks holds the shrimp bodies securely in the proper orientation so that with proper adjustment of the adjusting shaft 51, the cutting disk does not cut the first joint or the last ($5^{th}$) joint of the shrimp body, but cuts the intermediate joints ($2^{nd}$ through $4^{th}$). A cut $118^{th}$ of an inch deep in this region is sufficient to cut the joints.

The second bar 47 (extending into the space between the lower disks 37 and 38) pops the shrimp body out of the concave region of the disks when it rotates to that point, and the shrimp body falls through the oval opening 30 in the bottom of the cover.

A mechanism for adjusting the depth of cut is shown in FIG. 1. It can be seen that one end of a lever arm 56 is mounted to a flattened interior end 57 of the adjusting shaft 51 with a set screw 58 which causes the lever arm to rotate with the adjusting shaft. At the other end of the lever arm, a block 59 is mounted with a bolt 61. The block is free to rotate about the bolt. The block is threadably mounted to an adjusting rod 62 which extends diagonally through the motor housing 11 and exits through a flexible support 70 mounted in an aperture in the front side 63 of the motor housing. An adjusting knob 64 is mounted on the exterior end of the adjusting rod 62, and is used to rotate the adjusting rod. Rotation of the adjusting rod causes the block 59 to translate along the adjusting rod, thereby rotating the lever arm 56 through an arcuate distance. The range of motion of the block along the adjusting rod is limited in each direction by adjustable stop-collars 65.

Rotation of the lever arm 56, in turn, causes rotation of the adjusting shaft 51 as it passes through bearing 52. As seen in FIG. 2, rotation of the adjusting shaft 51 sweeps the external portion of the shaft through an arcuate change of position, thereby moving the lower flexible disks 37 and 38 closer to or farther away from the cutting disk 36. In this manner, the depth of cut made on the shrimp may be adjusted, while simultaneously preventing debris from the cutting operation from entering the motor housing 11. A stop collar (not shown) at the interior end of the adjusting rod 62 (FIG. 1) prevents the operator from adjusting the lower flexible disks 37 and 38 to the point that the cutting disk 36 contacts the spacer washers 44.

Still referring to FIG. 2, a protective shield 39 may be slidably engaged over the circular housing plate 31 for safety protection from the cutting disk 36. The shield 39 also serves to retain flying debris, which is created by the high speed cutting disk as it cuts the vein from the shrimp.

Thus, there has been described and illustrated herein, the preferred embodiment of an improved shrimp deveining apparatus. However, those skilled in the art will recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims.

What is claimed is:

1. An apparatus for cutting a shrimp body, the shrimp body having a tail portion that includes a plurality of tail sections connected by joints, the apparatus comprising:
    a housing;
    a cutting mechanism mounted outside the housing; and
    a motorized driving means mounted inside the housing for driving the cutting mechanism via first and second drive shafts extending through first and second apertures in a wall of the housing;
    wherein the cutting mechanism includes:
        a rotating cutting disk mounted on the first drive shaft and rotated by the motorized driving means; and
        means for securely holding the shrimp body and carrying the shrimp body past the rotating cutting disk, wherein the holding and carrying means is configured to position the shrimp body in relation to the rotating cutting disk so that when the cutting disk cuts the shrimp body, the cutting disk leaves a first joint at a head end of the tail portion and a last joint at a tail end of the tail portion intact while cutting least one intermediate joint between the first and last joints.

2. The apparatus according to claim 1, wherein the holding and carrying means includes a pair of parallel flexible disks rotatably mounted on an adjusting shaft, the parallel disks being separated by the approximate width of one shrimp body, wherein an inwardly facing surface of each disk includes an annular region having a concave radial curvature matching the curvature of a side of the shrimp body, wherein the concave radial curvature holds the shrimp body securely in place while the parallel flexible disks rotate on the adjusting shaft.

3. The apparatus according to claim 2, wherein the pair of parallel flexible disks is rotated through contact with a pair of drive disks mounted on the second drive shaft, which is rotated by the motorized driving means.

4. The apparatus according to claim 3, wherein the motorized driving means rotates the drive disks at a rate that is slower than a rate at which the motorized driving means rotates the cutting disk.

5. The apparatus according to claim 2, wherein the adjusting shaft is a rotating adjusting shaft having two equal-but-opposite bends that create a portion of the adjusting shaft which is parallel to, and offset from, the axis of rotation of the adjusting shaft.

6. The apparatus according to claim 5, wherein the pair of flexible disks is mounted on the offset parallel portion of the adjusting shaft.

7. The apparatus according to claim 1, further comprising an insertion mechanism for inserting the shrimp body into the holding and carrying means before the shrimp body passes the cutting disk.

8. The apparatus according to claim 7, wherein the holding and carrying means includes a pair of parallel flexible disks rotatably mounted on an adjusting shaft, the parallel disks being separated by the approximate width of one shrimp body, wherein an inwardly facing surface of each disk includes an annular region having a concave radial curvature matching the curvature of a side of the shrimp body, wherein the concave radial curvature holds the shrimp body securely in place while the parallel flexible disks rotate on the adjusting shaft; and
    the insertion mechanism includes a bar extending across a gap at an edge of the parallel flexible disks, wherein the bar is positioned to force a newly inserted shrimp body into the concave annular region between the parallel flexible disks prior to reaching the rotating cutting disk.

9. The apparatus according to claim 1, further comprising an extraction mechanism for extracting the shrimp body from the holding and carrying means after the shrimp body passes the rotating cutting disk.

10. The apparatus according to claim 1, wherein the holding and carrying means includes a pair of parallel flexible disks rotatably mounted on an adjusting shaft, the parallel disks being separated by the approximate width of one shrimp body, wherein an inwardly facing surface of each disk includes an annular region having a concave curvature matching the curvature of a side of the shrimp body, wherein the concave curvature holds the shrimp body securely in place while the parallel flexible disks rotate on the adjusting shaft; and the extraction mechanism includes a bar extending into the concave annular region of the parallel flexible disks, wherein the bar is positioned to force a freshly cut shrimp body out of the concave annular region between the parallel flexible disks after passing the rotating cutting disk, wherein the cut shrimp body is expelled from the apparatus.

11. An apparatus for cutting a shrimp body, the shrimp body having a tail portion that includes a plurality of tail sections connected by joints, wherein the apparatus is of the type having a housing, a cutting mechanism mounted outside the housing, and a motorized driving means mounted inside the housing for driving the cutting mechanism via first and second drive shafts extending through first and second apertures in a wall of the housing, the cutting mechanism including a rotating cutting disk rotated by the motorized driving means, wherein an improvement comprises:

a holding and carrying mechanism configured to securely hold the shrimp body and carry the shrimp body past the rotating cutting disk in a position in which the cutting disk leaves intact, a first joint at a head end of the tail portion and a last joint at a tail end of the tail portion, while cutting at least one intermediate joint between the first and last joints.

12. The apparatus according to claim 11, wherein the holding and carrying mechanism includes a pair of parallel flexible disks rotatably mounted on an adjusting shaft, the parallel disks being separated by the approximate width of one shrimp body, wherein an inwardly facing surface of each disk includes an annular region having a concave radial curvature matching the curvature of a side of the shrimp body, wherein the concave radial curvature holds the shrimp body securely in place while the parallel flexible disks rotate on the adjusting shaft.

13. The apparatus according to claim 12, further comprising an insertion device for inserting the shrimp body into the holding and carrying mechanism before the shrimp body passes the cutting disk.

14. The apparatus according to claim 13, wherein the insertion device includes a bar extending across a gap at an edge of the parallel flexible disks, wherein the bar is positioned to force a newly inserted shrimp body into the concave annular region between the parallel flexible disks prior to reaching the rotating cutting disk.

15. The apparatus according to claim 12, further comprising an extraction device for extracting the shrimp body from the holding and carrying mechanism after the shrimp body passes the rotating cutting disk.

16. The apparatus according to claim 15, wherein the extraction device includes a bar extending into the concave annular region of the parallel flexible disks, wherein the bar is positioned to force a freshly cut shrimp body out of the concave annular region between the parallel flexible disks after passing the rotating cutting disk, wherein the cut shrimp body is expelled from the apparatus.

* * * * *